United States Patent
Corral Garcia et al.

(10) Patent No.: US 8,066,488 B2
(45) Date of Patent: Nov. 29, 2011

(54) HIGHLY SLENDERNESS ROTOR

(75) Inventors: Roque Corral Garcia, Madrid (ES);
Juan Manuel Gallardo Antolín, Madrid (ES)

(73) Assignee: Industria de Turbo Propulsores, S.A., Zamudio, Vizcaya (ES)

( * ) Notice: Subject to any disclaimer, the term of this patent is extended or adjusted under 35 U.S.C. 154(b) by 582 days.

(21) Appl. No.: 11/786,383

(22) Filed: Apr. 10, 2007

(65) Prior Publication Data
US 2008/0112809 A1 May 15, 2008

(30) Foreign Application Priority Data
Jul. 18, 2006 (EP) .................................... 06380203

(51) Int. Cl.
*F01D 5/22* (2006.01)
(52) U.S. Cl. .................... 416/190; 416/191; 416/196 R; 416/203; 416/500
(58) Field of Classification Search .......... 416/189–191, 416/196, 203, 500
See application file for complete search history.

(56) References Cited

U.S. PATENT DOCUMENTS

| | | | | |
|---|---|---|---|---|
| 1,639,247 A | * | 8/1927 | Zoelly et al. ................. | 416/190 |
| 2,308,426 A | * | 1/1943 | Rettaliata .................... | 416/190 |
| 5,211,540 A | * | 5/1993 | Evans ........................ | 416/190 |
| 5,232,339 A | * | 8/1993 | Plemmons et al. ........... | 415/178 |
| 5,540,551 A | | 7/1996 | Heinig | |
| 6,371,727 B1 | | 4/2002 | Stangeland et al. | |

FOREIGN PATENT DOCUMENTS

| | | |
|---|---|---|
| GB | 835177 | 3/1958 |
| GB | 1 287 223 | 8/1972 |
| GB | 2 251 034 | 6/1992 |

* cited by examiner

*Primary Examiner* — Edward Look
*Assistant Examiner* — Jesse Prager
(74) *Attorney, Agent, or Firm* — Merchant & Gould P.C.

(57) ABSTRACT

The present invention relates to a rotor for gas or steam turbines having a disk (1), an outer cover (2) and a plurality of blades (3). The disk (1) defines the portion of less diameter of the rotor and has an inner surface configured to be coupled on a shaft (100) of the turbine or connected to an axially adjacent disk (1', 1"); an outer surface configured for housing a plurality of blades (3). The outer cover (2) defines the portion of greater diameter of the rotor. The blades (3) have a root (31) configured to be coupled on the disk (1) and a tip (32) opposite to the outer cover (2). Between these blades there is a plurality of blades (3) welded together at the tip (32) to form groups of blades (3a) and individual blades (3b) intercalated between groups of blades (3a).

7 Claims, 5 Drawing Sheets

HIGHLY SLENDERNESS ROTOR

FIELD OF THE INVENTION

The invention relates to a highly slenderness rotor used in thermal turbines.

BACKGROUND OF THE INVENTION

The design of highly slenderness rotors can be dominated by problems of aeroelasticity. These problems consist of two types depending on the source of excitation.

For small rotor frequencies in comparison with the inverse of the residence time (the time it takes for a fluid particle to pass through the rotor), the rotor may become aerodynamically unstable; under these circumstances, the amplitude of the vibration of the rotor is limited by friction. This phenomenon is known as limited amplitude flutter.

The second type of problems is known as forced response. In this case, the rotor is excited due to the wash of the preceding row and the amplitude of the vibration around the resonances is limited by aerodynamic damping and friction.

In both cases, increasing the aerodynamic damping has a beneficial effect on the life of the component.

There are several concepts for increasing the aerodynamic damping of rotors. Reference is herein made only to those that are related to the modification of the upper cover of the rotor or shroud. The main alternatives are the use of Z-shaped upper covers of the blade or rotor, commonly referred to as shrouds, making contact with the neighboring rotors and the use of the pairs of welded rotors (pairs of blades welded by the shroud).

Rotors with a Z-shaped upper cover for the blades, or shroud, and in contact with the adjacent rotors increase their stability essentially due to the increase of the natural frequencies provided by the support on the neighboring rotors. The main drawback is that they are difficult to precisely calculate and evaluate the influence of the wear of the contact over time which further introduces an additional dissipation. The pairs of welded rotors barely modify the natural frequencies of individual rotors, but not its mode shapes, which are very different. Its operating principle is that the welding prevents the relative movement between the blades of the pair for the most unstable modes, reducing virtually to zero the non-stationary pressure disturbances at the midway point of the passages between blades, significantly reducing the source of instability.

Both concepts have the same common point: they generate a single fundamental section that is repeated until the complete ring of the rotor is formed.

The Z-shaped interlock or shroud concept is widely used in the United States and Europe by all turbine manufacturers. The welded pair concept is only used by one turbine manufacturer, probably because its physical basis was not well understood until a short time ago.

SUMMARY OF THE INVENTION

The present invention proposes new methods for increasing the aerodynamic damping of turbine rotors using several different fundamental sections to complete the ring of the rotor. The difference between some fundamental sections and others is determined by the internal arrangement of the blades, i.e. by the combinations of individual blades and pairs and trios of blades forming the different types of fundamental sections.

The invention is based on the simultaneous in-depth knowledge of two different phenomena:
- The dynamics of blade-disk assemblies with pairs/trios of blades welded together.
- The aerodynamic damping of individual blades and pairs/trios of blades welded together.

This knowledge is generally difficult to acquire because:
- The lack of realistic experimental data on aerodynamic damping of pairs of rotor blades
- The lack of efficient computational tools for calculating the aerodynamic damping outside of some of the reference companies in the field of gas turbine manufacturers.

The simultaneous knowledge and comprehension of both problems is not very wide-spread, it could even be said that it is inexistent, because in addition to the intrinsic difficulty of both problems separately described above, there is the fact that this knowledge generally resides in different specialists in the companies. On the other hand, the motivation for carrying out this type of configurations by companies that do not used blades welded in pairs is low or inexistent, reducing even more so the potential group of people who could consider this solution.

The invention of trios of blades welded together is very simple and is a natural continuation of the pairs of blades welded together. It requires in-depth knowledge of how aerodynamic damping works in general and for pairs of blades in particular.

In any case, this process is not a "routine" way of increasing the aerodynamic damping of blades. The routine process consists of increasing the frequency of the blades, which strictly speaking is known as the reduced frequency or the Strouhal number; the reduced frequency is a dimensionless parameter=angular velocity×Chord/Characteristic velocity=residence time/characteristic time. The main drawback of the "routine" way of proceeding is that it requires a significant increase in the turbine weight. However, it is not known if nominally different geometries in different sectors, at least of the type described, have been used up until now.

The object of the invention is to modify particularly the mode shapes of the blade-disk assembly; the assembly frequencies are also modified but their contribution to the increase in damping is negligible in a first approximation.

The blades welded together in pairs increase their stability because the blades welded together are forced to vibrate in phase. The channel located inside the welded pair has virtually no non-stationary pressure due to the vibration of the blade, which reduces instability. Trios of blades operate under the same principle, but rather than canceling out the activity in every other passage, i.e. in the passage areas defined between two blades, they cancel out the activity in two out of three passages so they are more effective.

The concept of having alternating sections with individual blades and pairs or trios of blades works differently. Each family of modes or auto-functions of the blade-disk assembly (bending, torsion and the like) is divided into two families: one in which the pair or trio of blades vibrates and the individual blade does not in a first approximation, and another one in which the individual blade vibrates and the pairs/trios do not. This means that there are basically two types of passages in the assembly:
- Passages contained in the pairs or trios, where the blades vibrate in phase, are stable and with low levels of non-stationary pressure.
- Passages located between the individual blades and the pairs or trios. In these passages or channels, everything works as if the blades vibrated in antiphase inside the channel, giving rise to high levels of non-stationary pressure but which are stable. All the passages of the rotor are thus stabilized for the most unstable mode families, essentially bending, and the most unstable bending modes are eliminated (those modes corresponding to nodal diameters about one fourth of the number of fundamental sections (which encompass individual and pairs of blades), which are not shown in these configurations).

To substantially stabilize the rotor is it necessary to prevent modes in which the neighboring blades vibrate with a 90 degree phase lag. The role of trios is to obtain greater flexibility in the selection of the number of blades of the ring without losing the beneficial effects of stabilization. Therefore, by means of pairs the ring has a number of blades that is a multiple of two; by means of trios, they are multiples of three; by means of individual-pairs of blades, also multiples of three; by means of individual-trios of blades, they are multiples of four. Groups of four or five blades can also be chosen.

A first aspect of the invention relates to a rotor for gas or steam turbines having:
a disk defining the portion or annulus of less diameter of the rotor, said disk comprising:
  an inner portion comprising connecting means selected from:
    first connecting means for connecting the disk to a shaft of the turbine;
    second connecting means for connecting the disk with an axially adjacent disk;
    and combinations thereof; (usually, only one of the turbine disks is coupled to the shaft, whereas the disks are axially joined to one another by means of flanges);
  an outer portion comprising fixing means for housing a plurality of blades;
  an outer cover defining the portion or annulus of greater diameter of the rotor;
in which:
  the blades have a root configured to be coupled to the fixing means and a tip opposite to the outer cover;
characterized in that it comprises:
  a plurality of blades welded together at the tip to form groups of blades;
  individual blades intercalated between groups of blades.
The groups of blades can be pairs or trios.
On the other hand, the fixing means and the roots of the blades can have dovetail or pine tree shape.

A second aspect of the invention relates to a turbine comprising at least one rotor according to the one previously described and a shaft joined to the rotor such that the shaft of the turbine is driven by the rotor so as to make it rotate about its axis of rotation. In other words, in one turbine there is at least one rotor connected to the shaft of the turbine through the first connecting means that are in the disk, whereas the remaining disks are connected to one another by means of axial flanges which are the second connecting means of the disks.

The invention also contemplates the case in which a turbine is formed by a single rotor.

A third aspect of the invention relates to a craft comprising a gas turbine such as the one described above.

BRIEF DESCRIPTION OF THE DRAWINGS

A series of drawings aiding in better understanding the invention and expressly related to an embodiment of said invention, shown as a non-limiting example thereof, shall be very briefly described below.

FIG. 1BB is a simplified scheme of FIG. 1B.

FIG. 1CC shows a simplified scheme of FIG. 1C.

DETAILED DESCRIPTION OF THE PREFERRED EMBODIMENT(S)

Figure 1A:
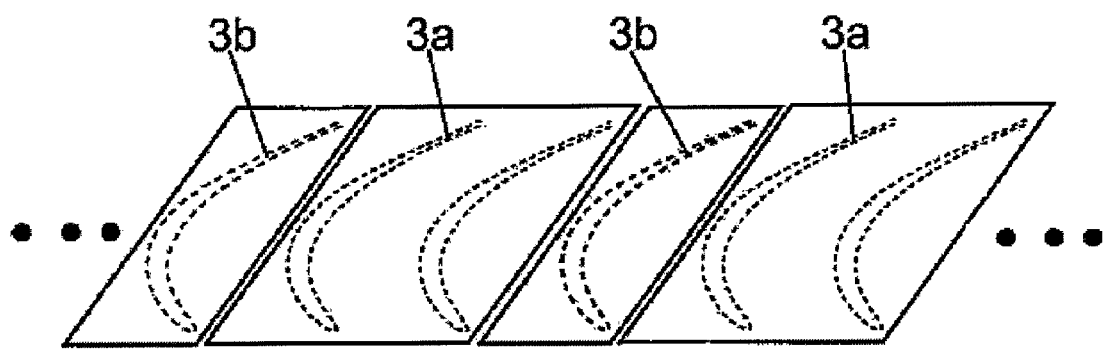
FIG. 1A shows a scheme of a ring of a rotor formed by individual cantilevered blades and pairs of blades welded together arranged in an alternating manner.
Figure 1B:
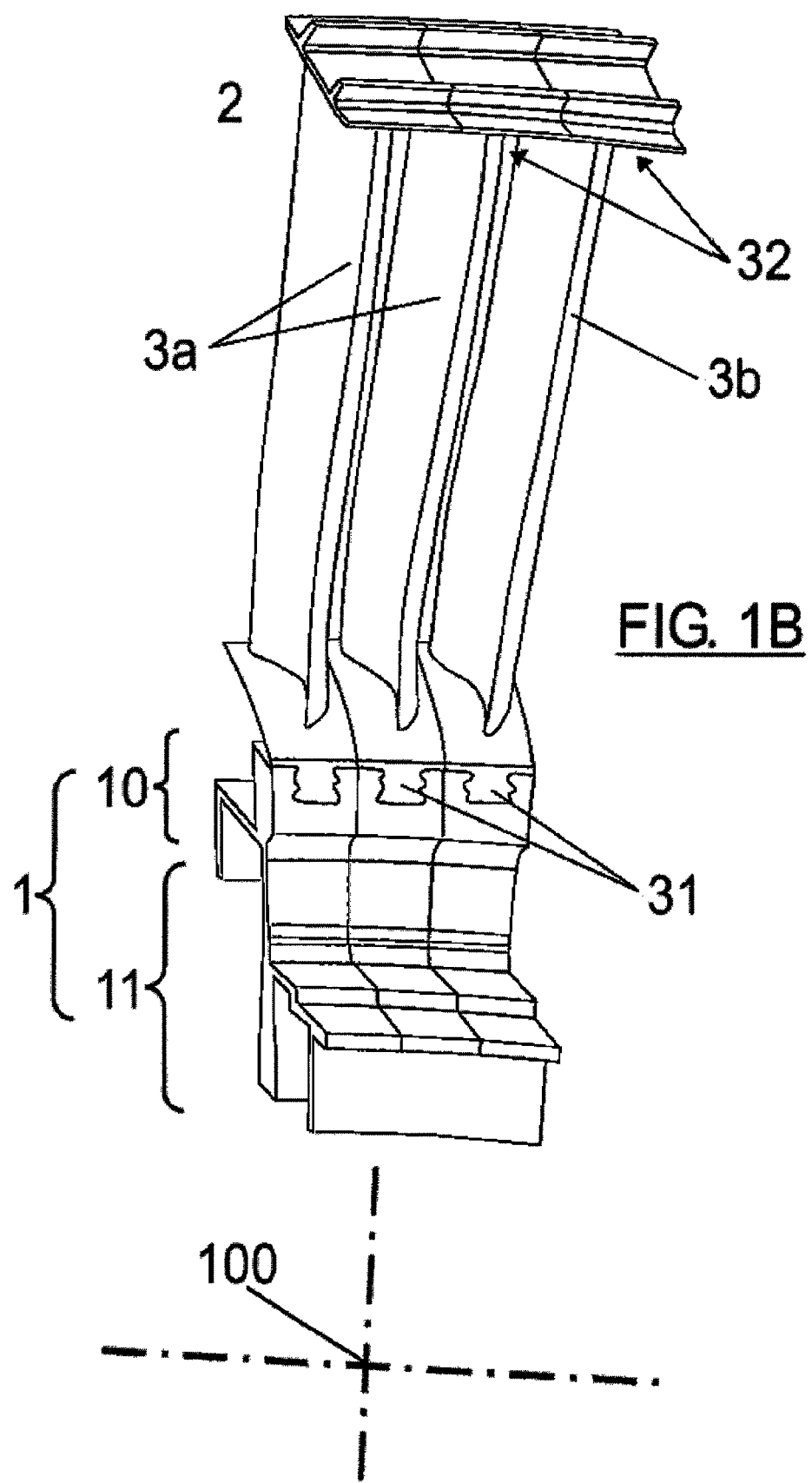
FIG. 1B shows a view of an elementary section of a rotor formed by an individual cantilevered blade and a pair of blades welded together. The complete ring is obtained by repeating this elementary/fundamental section the necessary number of times.
Figure 1C:
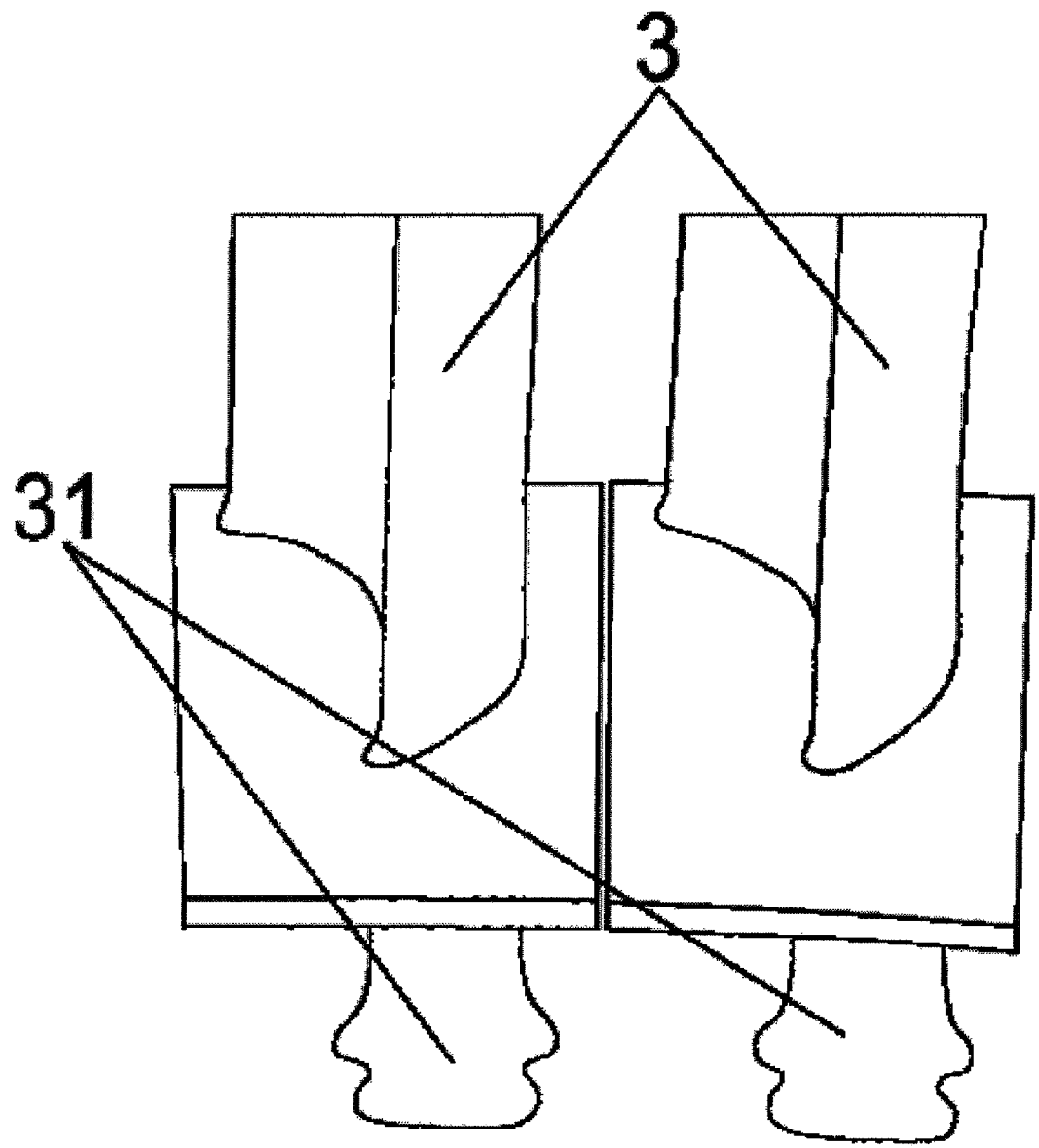
FIG. 1C shows a construction detail of the platforms of a pair of blades welded together.
Figure 1B:
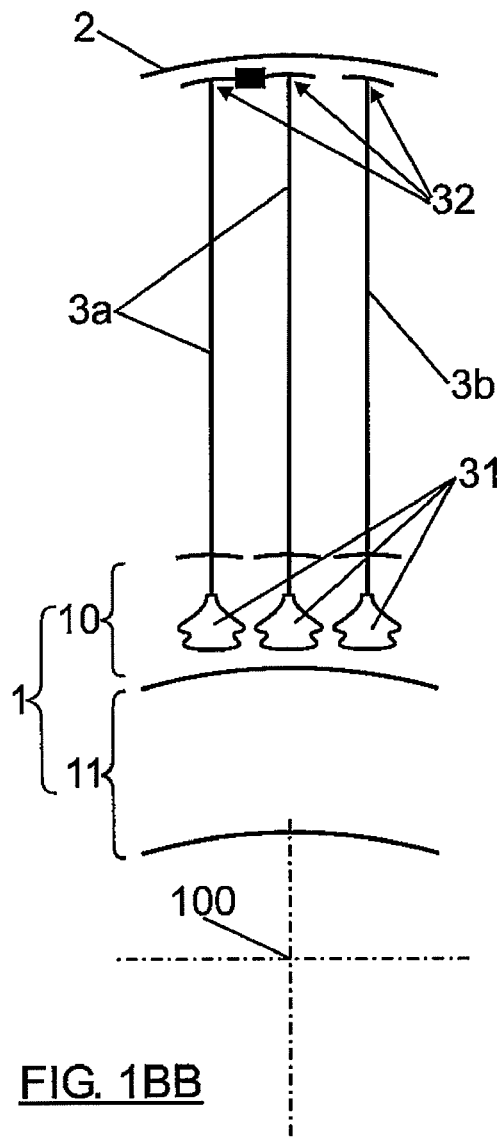
Figure 1C:
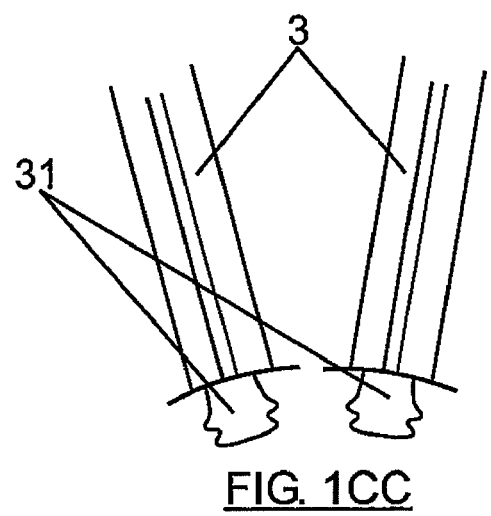
Figure 2:
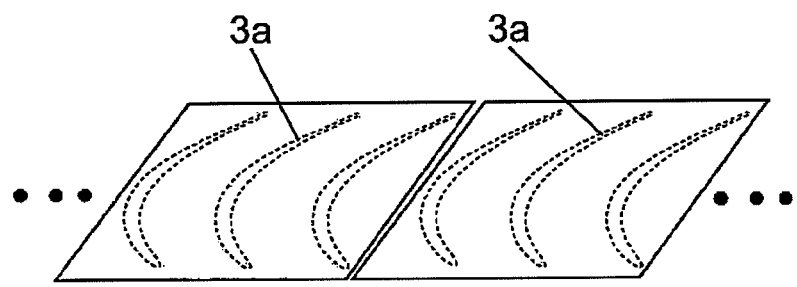
FIG. 2 shows a scheme of a rotor formed by trios of blades welded together at the shroud or cover of the blade.
Figure 3:
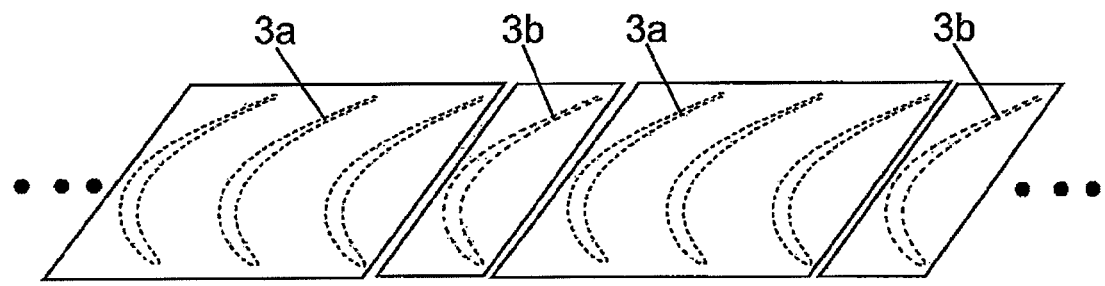
FIG. 3 shows a scheme of the upper part of a ring of a rotor, formed in an alternating manner by trios of blades welded together and individual cantilevered blades.
Figure 4:
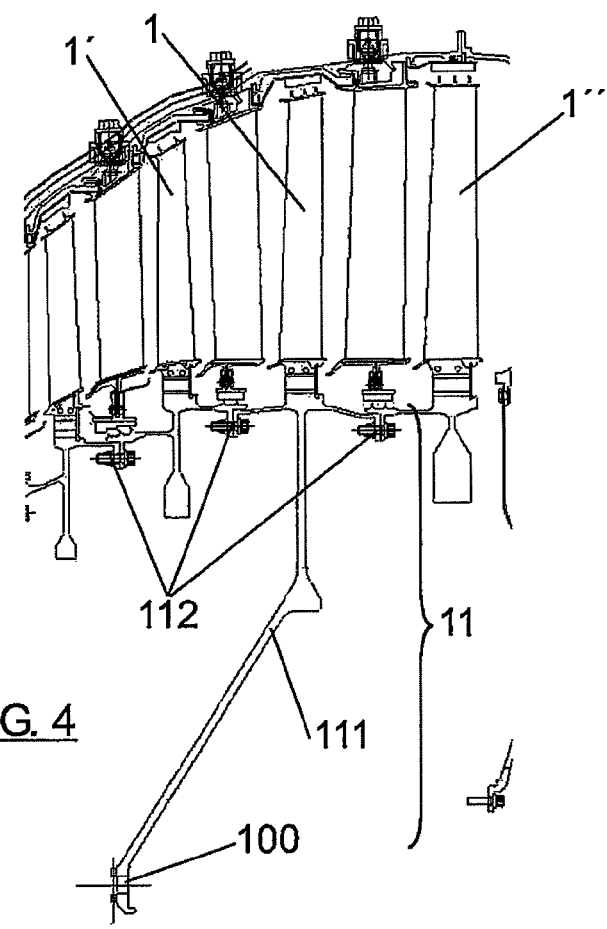
FIG. 4 shows an axial sectional scheme of a turbine showing the first connecting means for connecting a disk to the shaft of the turbine and the second connecting means for connecting disks to one another by means of axial flanges.

A first embodiment of the invention relates to a ring of the rotor formed in an alternating manner by individual cantilevered blades (3b) and pairs of blades (3a) welded together at their upper end or shroud (2). This concept significantly increases the aerodynamic damping of the ring by substantially modifying the mode shapes of the blade (3)-disk (1) assembly. This modification is due to the small difference in natural frequencies between the individual blade (3b) and the pair of blades (3a) considered to be embedded at the level of the insertion. This causes a phase change between the pairs of blades (3a) and the neighboring individual blades (3b) and vice versa, substantially modifying the aerodynamic damping.

A second embodiment of the invention relates to a ring formed by trios of blades (3a) welded together at their upper end or shroud (2). This concept is an extension of that of the pairs of blades (3a) welded together. It causes greater damping by minimizing the non-stationary pressures in two out of every three passages rather than in one out of two. The non-stationary pressures are generated when the blade vibrates, inducing pressures varying over time due to the vibration of the blade.

A third embodiment of the invention relates to a ring formed by single individual cantilevered blades (3b) and trios of blades (3a) welded together at the upper end or shroud (2) in an alternating manner, i.e. the sequence of the blades in the ring is individual blade (3b)-trio of blades (3a). This concept is an extension of the previous one with greater aerodynamic damping and further allowing greater freedom in combination with the previous one, i.e. single blades can be combined with pairs and trios of blades for selecting the optimal number of blades (3) of the ring. The increase in damping is essentially due to the modification of the mode shapes of the blade (3)-disk (1) assembly.

Several construction details are included below, such as the ways of joining the different blades (3) and of joining the blades (3) and the disk (1). The way of mooring them to the disk (1) is common to all the configurations shown.

Individual blade (3b): The blades do not make any contact with one another. Each blade is joined to the disk (1) through a dovetail or pine-tree shaped union (31).
  Pairs of blades (3a) welded together: The union between the different blades (3a) is limited to the lateral side of the upper cover (2), which is welded. The lower platforms of the rotors are not joined. The mooring of each blade (3) to the disk (1) is done by means of a pine tree-shaped union (31) and is independent for each of them. The only coupling between the blades of the different pairs of blades (3a) of the ring is done through the disk (1).

Trios of blades (3a) welded together: This is the same philosophy as in the case of the pairs of blades (3a) but with three blades rather than two. The way of mooring and the contacts are identical to the previous case.

The invention claimed is:

1. A rotor for turbines having:
 a disk defining a first diameter of the rotor, said disk comprising:
  an inner portion comprising connecting means selected from:
   first connecting means for connecting the disk to a shaft of the turbine;
   second connecting means for connecting the disk to an axially adjacent disk;
   and combinations thereof; and
  an outer portion comprising fixing means for housing a plurality of similar blades;
 an outer cover defining a second diameter of the rotor greater than the first diameter;
 wherein each of the blades include a root configured to be coupled to the fixing means and a tip opposite from the root and adjacent to the outer cover; and
 wherein groups of blades of the plurality of blades are welded together at the tip and individual blades of the plurality of blades are intercalated between and decoupled at the tip from groups of blades, and do not contact the groups of blades at the tip.

2. The rotor of claim 1, wherein the groups of blades of the plurality of blades comprise two blades welded together at the tip.

3. The rotor of claim 1, wherein the groups of blades of the plurality of blades comprise three blades welded together at the tip.

4. The rotor of claim 1, wherein a root comprises a shape selected from a dovetail shape and a pine tree shape.

5. A turbine comprising at least one rotor according to claim 1 and a shaft joined to the rotor such that the shaft of the turbine is driven by the rotor so as to make it turn about its axis of rotation.

6. A craft comprising a gas turbine according to claim 5.

7. A turbine rotor, comprising:
 a) a plurality of similar blades, each of the blades having a root at a first end and a tip at an opposite second end;
 b) a disk defining a first diameter of the turbine rotor, the disk including:
  i) an inner section having a first connector arranged and configured to connect the disk to a shaft of the turbine; and
  ii) an outer section comprising a plurality of blade joining sections, the blade joining sections cooperatively connecting with the roots of the plurality of blades; and
 c) an outer cover defining a second diameter of the rotor greater than the first diameter, with the tips of the plurality of blades being adjacent to the outer cover, and wherein groups of blades of the plurality of blades are welded together at the tips and individual blades of the plurality of blades are intercalated between, and decoupled at the tip from, the groups of blades that are welded together at the tips, and do not contact the groups of blades at the tip.

* * * * *